United States Patent [19]

Carter

[11] Patent Number: 4,656,206

[45] Date of Patent: Apr. 7, 1987

[54] THERMOPLASTIC POLYMER COMPOSITIONS

[75] Inventor: Moira A. Carter, Stourbridge, England

[73] Assignee: BIP Chemicals Limited, Manchester, England

[21] Appl. No.: 809,269

[22] Filed: Dec. 16, 1985

[30] Foreign Application Priority Data

Dec. 20, 1984 [GB] United Kingdom ............... 8432213
Mar. 21, 1985 [GB] United Kingdom ............... 8507425

[51] Int. Cl.$^4$ ..................... C08L 67/02; C08J 3/20
[52] U.S. Cl. ................... 523/351; 524/513; 524/539
[58] Field of Search ............... 523/351; 524/513, 539

[56] References Cited

U.S. PATENT DOCUMENTS 3,905,937 9/1975 Khanna ........................ 524/539
4,279,802 7/1981 Laely et al. .................... 524/539

FOREIGN PATENT DOCUMENTS 57-59959 4/1982 Japan .......................... 524/513

OTHER PUBLICATIONS

Bjorksten et al.; Polyesters and Their Applications; Reinhold Pub. Co. 1956; pp. 207–208.

Primary Examiner—Lewis T. Jacobs
Attorney, Agent, or Firm—Nixon & Vanderhye

[57] ABSTRACT

A pigmented thermoplastic polymer masterbatch composition comprises a polyester of melting point above 200° C. based on polyethylene terephthalate, a second polymer to plasticize the polyester, and pigment in an amount of at least 20 parts per 100 parts of composition. The second polymer can be also a toughening agent for the PET and can be a polycarprolactone, or a copolymer of ethylene with acrylic acid or vinyl acetate.

10 Claims, No Drawings

THERMOPLASTIC POLYMER COMPOSITIONS

This invention relates to thermoplastic polymer compositions and more particularly to compositions which can be used as masterbatches for pigmentation purposes, and to methods of using such compositions.

Thermoplastic polymers such as those based on polyethylene terephthalate (PET) are now in use in moulding compositions in the plastics industry, but being engineering thermoplastics they are frequently in use in relatively small components and tonnages. It is therefore convenient to colour PET compositions by masterbatching techniques owing to the low tonnages involved and the fact that "dry" colouring with pigments, is messy and can lead to uneven results.

Commercial masterbatches are available which can be used to colour PET compositions but these have drawbacks in that (i) They are based on low melting point polymers which melt at the drying temperatures for PET making it impossible to dry or redry polymer once blended.

(ii) The presence of low melting point polymer adversely affects certain properties, particularly heat distortion temperature and flammability.

A possible solution to the problem was to make masterbatches based on PET itself. This would eliminate any drying problems, in that polymer composition and masterbatch would require the same conditions. Thus trials were carried out, but it was found that attempts to make masterbatches by incorporating high pigment loadings eg 30 to 40% by weight into PET failed because too high a torque was generated in the compounding extruder. Masterbatches containing less than 20% by weight of pigment would not be acceptable because in use too much would have to be used thus adversely affecting the properties of the final pigmented composition.

Masterbatches based on low molecular weight copolyesters are described in UK Pat. No. 1,490,320 but these are for colouring fibre or film grade polyesters and deliberately avoid the use of PET itself as the base polymer.

European Pat. No. 0 114 386 also describes colourant masterbatches for PET. In this patent a particular recrystallisation exotherm is specified and the colourant carrier used is a mixture of a linear polyester of softening point over 60° C. and polybutylene terephthalate. The linear polyesters used have softening points well below that of PET itself.

We have now found that it is possible to manufacture extremely useful masterbatches if a small proportion of other polymer is incorporated into PET/pigment mixture for masterbatching.

Thus according to the present invention a pigmented thermoplastic polymer masterbatch composition comprises a polyester having a melting point above 200° C. and based on polyethylene terephthalate repeating units, a second solid polymer capable of plasticizing said polyester, and at least 20 parts by weight of pigment per hundred parts by weight of composition, the amount of said second polymer being sufficient to facilitate wetting out of the pigment in the polymer composition.

The second polymer will generally soften at a much lower temperature than PET, for example in the range 50° C. to 120° C. Preferably also the second polymer is one which will toughen the resulting composition. Suitable toughening polymers include polycaprolactones, copolymers of ethylene with unsaturated carboxylic acid monomers such as ethylene-acrylic acid copolymers, and copolymers of ethylene with unsaturated esters such as ethylene-vinyl acetate copolymers.

Preferably the toughening, plasticizing polymer has a melting point in the range 50° C. to 100° C. One preferred second polymer is ethylene-acrylic acid copolymer. Other preferred second polymers are polycaprolactones, which may have molecular weights of from 200 to 100,000 although particularly preferred are polycaprolactones of molecular weights greater than 20,500 since these have other beneficial effects in PET compositions as discussed in UK patent application No. 2,125,057A.

The amount of the second polymer will generally be in the range 2 to 20 parts by weight per 100 parts by weight of total polymer.

Pigment may be incorporated in the masterbatch composition in high loadings eg 60 percent by weight of total composition. It is preferred that the masterbatch contains as high a loading as practicable, to minimise dilution of the composition being pigmented, the preferred loadings being in the range 30 to 60 percent.

The masterbatch composition is used to pigment PET compositions simply by adding a minor proportion of masterbatch to the composition being pigmented and blending the two together, for example in a tumble blender. PET compositions of the type described and claimed in UK patent application No. 2,125,057A may be pigmented in this way but the masterbatch composition may equally well be used in other PET compositions.

The invention will now be more particularly described by means of examples.

EXAMPLES 1 AND 2

In Example 1 a commercial masterbatch containing 50% cadmium red pigment in EVA was dry blended at an addition level of 3% in a commercially available PET moulding composition (BEETLE PET 804F ex BIP Chemicals Limited). This was injection moulded to give a particular red colour. In Example 2, a PET masterbatch comprising 63 parts of a PET of melting point 255° C., 7 parts CAPA 601P (polycaprolactone of number average molecular weight 45,000–50,000 and melting point 60° commercially available from Interox Chemicals Ltd) and 30 parts cadmium red pigment was easily compounded on a Welding Engineers extruder. A similar masterbatch without polycaprolactone would not process successfully on a Welding Engineers extruder. This was dry blended at an addition level of 5% in Beetle PET 804F and injection moulded to give the same red colour. Properties of the two sets of mouldings are compared below:

|  | Example | |
|---|---|---|
|  | 1<br>PET 804F + 3%<br>commercial<br>masterbatch | 2<br>PET 804F + 5%<br>PET masterbatch |
| Flexural modulus GPa | 9.7 | 9.8 |
| Charpy notched impact strength KJ/m$^2$ | 7.8 | 7.7 |
| Flammability rating UL94 test at 1.5 mm | V2 | V0 |
| Heat deflection | 203 | 208 |

-continued

| | Example | |
|---|---|---|
| | 1 PET 804F + 3% commercial masterbatch | 2 PET 804F + 5% PET masterbatch |
| temperature °C. measured at 1.8 MPa | | |

It will be noted that the composition of Example 2, in addition to being capable of being dried if necessary after the masterbatch of pigment was added was also superior in flammability rating and heat distortion temperature.

EXAMPLES 3 AND 4

A PET masterbatch comprising 36 parts of the same PET as used in Example 2, 4 parts CAPA 601P and 60 parts titanium dioxide was compounded successfully on a Welding Engineers extruder. A similar masterbatch without polycaprolactone would not process satisfactorily on the same extruder.

In Example 4, to give a particular white colour, 3% of this PET masterbatch was dry blended with a commercially available PET moulding composition (BEETLE PET 102F ex BIP Chemicals Limited) and injection moulded. In Example 3, for comparison purposes, 5% of a commercial masterbatch (containing 28% titanium dioxide in a Universal carrier) was also dry blended with BEETLE PET 102F and injection moulded.
NB. The word BEETLE used above is a registered trade mark of BIP Chemicals Limited.

Properties of the two sets of mouldings are compared below

| | Example No. | |
|---|---|---|
| | 3 PET 102F + 5% commercial masterbatch | 4 PET 102F + 3% PET masterbatch |
| Flexural strength (MPa) | 140 | 140 |
| Charpy notched impact strength (KJ/m$^2$) | 6.7 | 7.6 |
| Heat deflection temperature °C. measured at 18 MPa | 204 | 209 |

The mouldings containing the PET masterbatch showed a better impact strength and heat deflection temperature. Also the material could be successfully dried prior to moulding.

EXAMPLES 5 AND 6

A PET masterbatch comprising 54 parts PET of melting point 255° C., 6 parts EAA of melting point 100° C., cadmium orange and cadmium yellow pigment was compounded successfully on a Welding Engineers extruder. A similar masterbatch without EAA would not process successfully on the same extruder.

In Example 5 this was dry blended at 5.75% addition with a development grade PET extrusion compound and test specimens were injection moulded. For comparison purposes, mouldings were made from uncoloured extrusion compound, these results being given as Example 6.

Impact properties of the two sets of mouldings are compared below:

| | Example | |
|---|---|---|
| | 5 incl. 5.75% PET masterbatch | 6 No masterbatch |
| Charpy face notched impact strength KJ/m$^2$ | 15 | 15 |
| Charpy edge notched impact strength KJ/m$^2$ | 7 | 7 |
| Charpy un-notched impact strength KJ/m$^2$ | >100 | >100 |

Addition of PET masterbatch to the development material had no detrimental effect on its impact behaviour, and also the material could be dried successfully prior to moulding, showing that the EAA polymer was satisfactory as the plasticizing polymer in the masterbatch.

EXAMPLES 7 AND 8

Masterbatch preparation

PET masterbatches containing 52.25 parts PET of melting point 255° C., 2.75 parts CAPA 601P (polycaprolactone of number average molecular weight 45,000–50,000 and melting point 58°–60° C. commercially available from Interox Chemicals Limited) and 45 parts cadmium yellow pigment; and 46.75 parts of the PET, 8.25 parts CAPA 601P and 45 parts cadmium yellow pigment were both compounded easily on a Welding Engineers extruder.

EXAMPLES 9 AND 10

Masterbatch preparation

PET masterbatches containing 49.5 parts of PET as in Examples 7 and 8 above, 5.5 parts Ethylene Vinyl Acetate (EVA) copolymer (Evatane 571 of vinyl acetate content 15% by weight and melt flow index 8, commercially available from ICI plc) and 45 parts ultramarine blue pigment; and 49.5 parts PET, 5.5 parts EVA and 45 parts titanium dioxide pigment were compounded on a Welding Engineers extruder.

Moulding Trials

These masterbatches were blended with a commercially available PET moulding composition (BEETLE PET 102F ex BIP Chemicals Limited) and test specimens were injection moulded. Also, in example 11, uncoloured BEETLE PET 102F was injection moulded for comparison purposes.

Results of tests carried out on moulded speciments from examples 7 to 11 are given in the table below:

| | Example | | | | |
|---|---|---|---|---|---|
| | 7 Incl. 3.3% PET Masterbatch | 8 Incl. 3.3% PET Masterbatch | 9 Incl. 3.3% PET Masterbatch | 10 Incl. 4.4% PET Masterbatch | 11 No Masterbatch |
| Tensile Strength (MPa) | 71 | 70 | 71 | 67 | 73 |
| Elongation to break (%) | 1.8 | 1.7 | 2.1 | 2.1 | 1.5 |
| Charpy | 6.9 | 7.1 | 6.7 | 6.9 | 6.8 |

-continued

| | Example | | | | |
|---|---|---|---|---|---|
| | 7 Incl. 3.3% PET Masterbatch | 8 Incl. 3.3% PET Masterbatch | 9 Incl. 3.3% PET Masterbatch | 10 Incl. 4.4% PET Masterbatch | 11 No Masterbatch |
| notched impact strength (KJ/m$^2$) | | | | | |

The materials containing the masterbatches could be easily dried prior to moulding and there was no significant detrimental effect of the PET masterbatches on properties of the moulded test specimens.

I claim:

1. A pigmented thermoplastic polymer masterbatch composition comprising a polyester having a melting point above 200° C. based on polyethylene terephthalate repeating units, a second solid polymer capable of plasticising sand polyester and having a melting point in the range of 50° C. to 120° C., and at least 20 parts by weight of pigment per hundred parts by weight of composition, the amount of said second polymer being sufficient to facilitate wetting out of the pigment in the polymer composition.

2. A composition according to claim 1 in which the second polymer has a toughening effect when compounded in minor proportions with PET.

3. A composition according to claim 1, in which the second polymer is a polycaprolactone.

4. A composition according to claim 3 in which the polycaprolactone has a molecular weight in the range 20,500 to 100,000.

5. A composition according to claim 1, in which the second polymer is a copolymer of ethylene with acrylic acid or vinyl acetate.

6. A composition according to claim 1 in which the amount of said second polymer is in the range 2 to 20 parts by weight per 100 parts by weight of total polymer.

7. A composition according to claim 1 in which the amount of pigment is in the range 30 to 60 p.b.w.

8. A method for pigmenting a moulding composition comprising a polyester based on polyethylene terephthalate repeating units, which comprises dry blending said moulding composition with a pigmented masterbatch composition as claimed in claim 1.

9. A pigmented thermoplastic polymer masterbatch composition comprising a polyester of melting point above 200° C. consisting essentially of polyethylene terephthalate, a second solid polymer having a melting point in the range of 50° C. to 120° C. which has a toughening effect on polyethylene terephthalate when compounded in minor proportions therewith and a pigment in an amount of at least 20 parts by weight per 100 parts by weight of total polymer in the composition and being sufficient to facilitate wetting out of the pigment in the polymer composition.

10. A pigmented thermoplastic polymer masterbatch composition according to claim 9 in which the second polymer is selected from the group consisting of polycaprolactone, and copolymers of ethylene with acrylic acid or vinyl acetate, and the amount of pigment in the composition is in the range of 30 to 60 parts by weight per hundred parts by weight of composition.

* * * * *